O. O. STORLE.

Horse-Power.

No. 6,631.

Reissued Sept. 7, 1875.

Witnesses:

W. J. Smith
E. J. Smith

Inventor:

Ole O. Storle.

N. PETERS, PHOTO-LITHOGRAPHER, WASHINGTON, D. C.

UNITED STATES PATENT OFFICE.

OLE O. STORLE, OF MILWAUKEE, WISCONSIN, ASSIGNOR TO HIMSELF AND JOHN O. OVERBY, OF SAME PLACE.

IMPROVEMENT IN HORSE-POWERS.

Specification forming part of Letters Patent No. 126,912, dated May 21, 1872; reissue No. 6,631, dated September 7, 1875; application filed May 26, 1875.

*To all whom it may concern:*

Be it known that I, OLE O. STORLE, of Milwaukee, in the county of Milwaukee, in the State of Wisconsin, have invented certain Improvements in Horse-Powers, of which the following is a specification:

My invention is a horse-power mounted on wheels, and so arranged that when the horses are taken off the power, and it is set for work, the tumbling-rod lies just low enough for work.

The master-wheel operates two pinions—one on each side of it. One of these pinions is an intermediate, set between the main driving-shaft and the master-wheel, and gearing into a pinion on the main driving-shaft, and also into the cogs on the master-wheel; and the connection of the tongue to the power is of a peculiar character.

Figure 1:
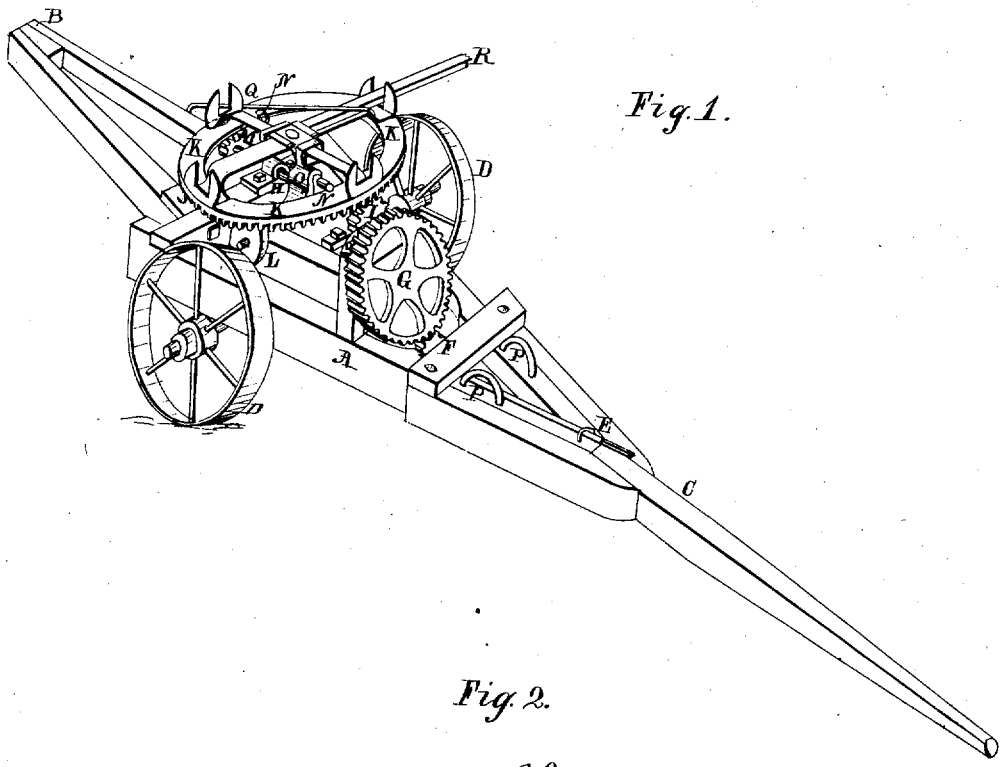
Figure 2:
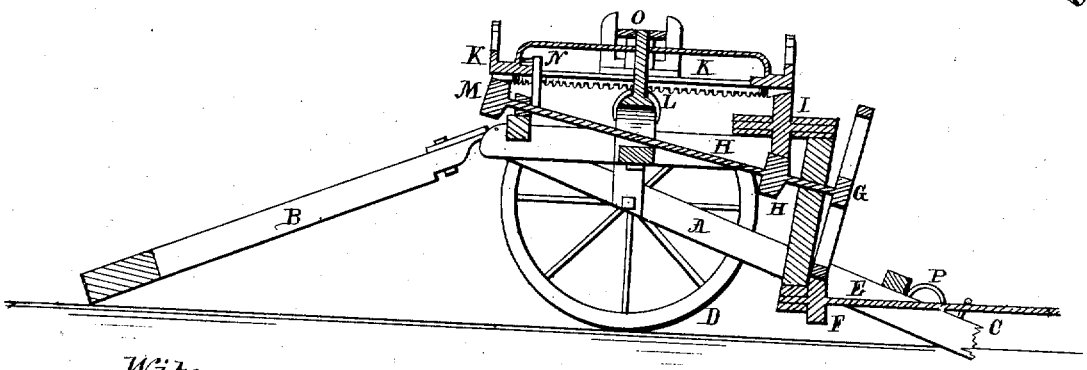

Figure 1 is a perspective view of my invention, and Fig. 2 is a longitudinal sectional view of same.

A is the frame of the power; B, the rear brace, hung to the frame by hinges at the forward end, and held up, when the power is moved from place to place, by the hook Q; C, the tongue, which is made crotched, with a bar across the end, which, when the tongue is in place, lies across the forward end of the frame A and behind the loops P in the frame. These loops prevent the tongue from sliding forward, and the tumbling-rod, coming over the tongue, holds it in position. A piece of wood or any other substance may be placed across under the loops, to prevent the tongue from sliding out of place. D D, wheels, on which the power stands; E, the tumbling-rod; F, pinion on the end of the tumbling-rod; G, wheel, into which pinion F meshes; H, pinion on the main driving-shaft, and meshing into intermediate pinion I, this pinion I meshing into cogs on the under side of master-wheel K; L, rollers, on which the master-wheel K rests, and which steadies it. There are two of these rollers opposite each other under the master-wheel, steadying it on two sides, while the pinions operated by it steady it on the other sides. M, pinion on the other end of the driving-shaft, and meshing into the cogs on the under side of master-wheel K; N, lugs, secured to the frame A, and hooking over the inside of the master-wheel, holding it down to its place; O, the center-pin, on which the master-wheel runs; P P, loops on the front end of frame A, which hold the tongue in place; Q, hook on brace B, to hold it up when the power is to be moved; R, sweep, with which to operate the power. This power operates pinions H, I, and M, the pinions I and M meshing into the cogs on the master-wheel, which are on one side of it only. The intermediate pinion I, operated by pinion H, turns in an opposite direction from pinion M, and thus the master-wheel operates; and this is the principal portion of my invention.

This power is operated by placing it in position, staking down the brace B; and the forward part of frame A connects the tumbling-rod to the machine to be operated. Hitch the horses to sweep R and drive ahead.

When it is necessary to move the power to another place, disconnect the tumbling-rod, turn up brace B, put on tongue C, and hitch the horses to the machine and drive to the point where the power is wanted for use.

As the tumbling-rod is at the front end of the power, it is easily adjusted, as to distance, in any place.

I claim as my invention—

1. The combination of frame A, tongue C, and loops P P, substantially as described.

2. The combination of master-wheel K, pinions F, H, I, and M, wheel G, lugs N, rollers L, and tumbling-rod E, arranged to be operated substantially as described.

3. A horse-power, with a master-wheel, in combination with pinions H, I, and M, arranged substantially as set forth.

OLE O. STORLE.

Witnesses:
J. B. SMITH,
E. J. SMITH.